Jan. 10, 1956  S. D. EILENBERGER  2,730,660
PHOTOGRAPHIC FLASH CIRCUIT
Filed April 10, 1953  2 Sheets-Sheet 1

INVENTOR.
Stanley D. Eilenberger
BY
ATTORNEY

Jan. 10, 1956  S. D. EILENBERGER  2,730,660
PHOTOGRAPHIC FLASH CIRCUIT

Filed April 10, 1953  2 Sheets-Sheet 2

INVENTOR.
Stanley D. Eilenberger
BY
ATTORNEY

United States Patent Office 2,730,660
Patented Jan. 10, 1956

2,730,660

PHOTOGRAPHIC FLASH CIRCUIT

Stanley D. Eilenberger, Kittredge, Colo., assignor, by mesne assignments, to Minneapolis-Honeywell Regulator Company, Minneapolis, Minn., a corporation of Delaware Application April 10, 1953, Serial No. 347,995

5 Claims. (Cl. 315—240)

This invention relates to an improvement in photographic flash circuits and more particularly to the type of flash equipment commonly called electronic repeating flash, where energy is taken from a battery or other power source, stored in a capacitor, and then discharged through a gas filled lamp to produce a brilliant flash of light of short duration for photographic purposes.

This invention more specifically relates to improvements in a photoflash circuit embodying a dry battery of the Le Clanche cell type as a primary power source and an electrolytic capacitor or capacitors as the energy storage unit.

It is well known in the art that electrolytic capacitors have two characteristics which for some purposes are detrimental. The first of these is leakage current. Contrary to high grade oil-filled or paper capacitors which, when fully charged, have a resistance approaching infinity and consequently a leakage current approaching zero, electrolytic capacitors, even when fully charged, do have appreciable and measurable leakage currents. The second characteristic of electrolytic capacitors which is sometimes detrimental is the need for forming such a capacitor by applying voltage and the fact that such a capacitor will deform when not in use e. g., with no voltage applied. This leakage current and deforming characteristic is not important when operating from alternating current power lines and is of only minor importance when operating from rechargeable storage batteries. However, both of these factors are important when operating from a dry battery which has a rather limited life and can supply only limited currents.

The first above mentioned characteristic of electrolytic capacitors, leakage current, has been substantially improved by the use of very high purity foils. Commercial capacitors are available which have a leakage current on the order of 0.001 ampere for a unit of 500 microfarads designed for operation at 450 D. C. volts. This is substantially better than leakage currents obtained with so-called commercial purity aluminum foil, even though the difference in percentage of impurities is slight. Using capacitors of the high purity foil type, electronic repeating flash units with substantial energy storage; for example, 60 to 100 watt seconds as calculated from the expression $$Ws = \frac{E^2}{C} \qquad (1)$$

where Ws is the energy storage in watt seconds, E is the voltage in kilovolts and C the capacity in microfarads, become practical for dry battery operation with relatively small batteries; for example, batteries built up from cells commonly designated as type U, which is one of the smallest commercially made flat cells or type NS which is the next largest commercial size.

As for the second undesirable characteristic mentioned, it has not been corrected and the primary object of my invention is to do so; that is, correct the deforming of the electrolytic capacitors while the unit is not in use.

As is commonly known to those skilled in the art, electrolytic capacitors will partially deform in a few hours and will almost completely deform within several months and in this deformed condition the initial surge current required to start forming the capacitor approximates the short circuit current of the battery and is limited only by the internal resistance of the battery and by whatever series charging resistor is placed in series between the battery and the capacitor. In order to overcome this difficulty with dry battery operation, it has been common commercial practice to use relatively large cells in the battery; for example, the commercial type N or larger and a relatively high value of series charging resistance; for example, 5000 ohms or higher. With a capacitor of 500 microfarads in the deformed state the amount of energy in milliampere hours furnished by the battery to form the capacitor may very well equal or exceed one-half the total life of the battery.

The leakage current of an electrolytic capacitor is not a linear function. The current decreases rapidly with voltage; for example, in a 500 microfarad unit designed for operation at 450 volts and constructed of high purity foil where the leakage current at 450 volts is on the order of 0.001 ampere, the leakage current will decline rapidly with voltage where with a fully formed capacitor the leakage current may be, for example, as low as 0.000003 ampere at a voltage as high as 300 volts. This will vary somewhat between capacitors, even between capacitors made on the same production run, but practical experience indicates that the leakage current on the average 500 microfarad high purity foil unit will be on the order of 2 to 4 microamperes in the voltage range of 250 to 350 volts. It has become accepted theory that a capacitor designed for operation at 450 volts which has only 300 volts applied will deform to the 300 volt value, but I have found that this is not strictly true; for example, a capacitor designed for operation at 450 volts which has 300 volts applied continuously will reform to 450 volts when 450 volts is applied to the capacitor in a period of time less than 1 second which accounts only for the time necessary to supply the stored energy and does not allow time for any reforming. Even with applied voltage as low as 150 volts to a 450 volt unit the capacitor will reach full energy storage upon application of 450 volts in approximately 1 second again, proving that no forming actually takes place.

Even for the smallest cell used in high voltage battery construction, for example, the type U construction, a current of 2 to 3 microamperes can be supplied continuously for a long period of time, such as one year, without serious injury to the battery or without materially affecting the residual energy in the battery. Theoretically, a battery composed of type U cells would reach an end point of 1.13 volts per cell in 20 hours at a 0.001 ampere load and would reach the same end point in 4250 hours, roughly six months, at a load of 0.000010 ampere and would reach the same end point at a load of 0.000003 ampere in a time approximating 30,000 hours which is substantially longer than the shelf life of the battery.

An important object of my invention resides in the provision of a relatively high range resistor, for example, on the order of 50 to 100 megohms in series with a relatively low range resistor, for example, 500 to 1000 ohms between the battery and the capacitor, short circuiting the high range resistor when operation is desired, thus allowing the capacitor to reach its full charge voltage in series with the low range resistor. When operation is completed for a particular period the unit is turned off by removing the short circuit from the high range resistor, thus leaving the battery connected to the capacitor in series with the high range resistor and leaving the capacitor in a state where it is fully charged. The voltage appearing across the capacitor will then drop to a value determined only by the battery voltage, the value of the high range resistor, and the leakage current of the capacitor. This is a dynamic relationship with favorable characteristics so that with time as the capacitor is more nearly perfectly formed and as a consequence thereof the leakage current becomes lower, the voltage appearing across the capacitor will become higher, which is desirable. With a unit wired in this manner the capacitor is never deformed as long as there is voltage left in the battery, and even where the battery voltage has become low enough that good operation is impossible a satisfactory voltage will be maintained at the capacitor and the capacitor will remain formed.

Another object is to produce an improved photoflash circuit of the type referred to which will permit the employment of a dry cell battery of relatively small size, yet the life of said battery will be longer than larger size batteries and will be capable of producing a greater number of flashes of a lamp.

A further object is to produce an improved photoflash circuit of the type referred to which will eliminate the necessity of the dry cell battery to produce a high forming current for the energy storage capacitor each time the photoflash equipment is turned on after a period of idleness.

Yet a further object is to produce a new method of preventing an electrolytic condenser employed in a photoflash circuit, with a dry cell battery and a flash lamp, from deforming.

Other objects of my invention will become apparent from the following detailed description taken in connection with the accompanying drawings in which.

Figure 1:
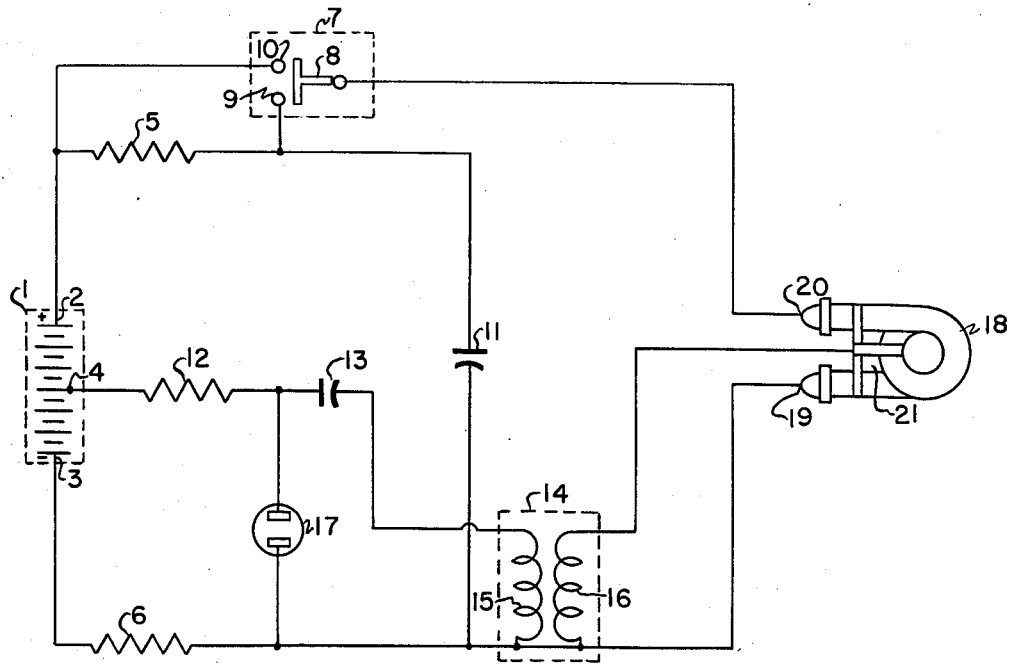
Figure 1 represents a general circuit diagram of a complete electronic repeating flash unit making use of my invention.

Referring now particularly to Figure 1, the high voltage battery is represented by 1 and this battery may be composed of U, NS or any other desirable cells and have a voltage in the range of 450 to 550, depending upon the energy storage capacitor and other design factors. Battery 1 has a plus terminal 2, a negative terminal 3 and a tap for intermediate voltage terminal 4. This intermediate voltage is used for triggering the gas filled lamp and such an intermediate voltage terminal is preferred to a voltage divider network, inasmuch as the network consumes current and an intermediate voltage obtained directly from the battery does not. The high range resistor is indicated at 5 and, for purposes of illustration only, this is assumed to be 68 megohms, it being understood that any resistance value giving satisfactory results may be used where the general range of this resistance will usually fall between 50 and 150 megohms. The low voltage resistor is indicated at 6 and, for purposes of example, this may be assumed to be 1000 ohms, it being understood that any other suitable value may be used and that under the right design circumstances resistor 6 may be omitted entirely and the internal resistances of the battery would then remain as the only series resistance in charging the capacitor.

The operating switch 7 has an arm 8 designed to short circuit terminals 9 and 10 and will in turn short circuit resistor 5. The full voltage of battery 1 is then applied to energy storage capacitor 11 in series with charging resistor 6. The high voltage energy stored in capacitor 11 is connected directly to gas filled lamp 18, the plus side of the capacitor being connected to anode 20 and the negative side to cathode 19. For purposes of example, lamp 18 is assumed to be of a type where the voltage applied to anode and cathode is substantially below the self-ionizing voltage of the lamp and where a trigger pulse is necessary to ionize the lamp, causing it to convert the stored energy into light, this process being well understood to those skilled in the art, and it is further understood that other types of lamps may be employed with this invention and that the lamp shown is illustrated by way of example only.

A conventional trigger circuit is represented by trigger resistor 12, trigger capacitor 13, trigger coil transformer 14, and trigger electrode 21 on the lamp, triggering being accomplished through outlet 17 which is normally connected to the shutter contacts of a camera. The operation of this circuit is conventional where capacitor 13, usually on the order of one-quarter to one-half microfarad, is charged in series with resistor 12, usually one-half to 1 megohm, and the primary 15 of transformer 14. Short-circuiting the terminals of outlet 17 causes an oscillatory discharge of capacitor 13 in series with primary 15, thus causing a momentary high voltage pulse in secondary 16 which is applied to the trigger electrode of the lamp, usually a band outside of the glass tube, which is capacity coupled to the gas in the lamp, where the gas is usually xenon. A typical tube of this type is shown in the Casellini et al. Patent No. 2,492,619. In the Casellini et al. patent, xenon is employed and the gas is maintained at a pressure of 40 millimeters of mercury. The pressure of the gas in such lamps depends upon various factors, however, such as the spacing of the electrodes and the voltage to be employed across the lamp, and the gas pressure can accordingly be within a wide range of values depending upon these other factors. This matter of the desirable gas pressure is discussed in the Germeshausen Patent No. 2,592,556. As previously stated, any other type of flash tube may be employed in this invention and it is likewise understood that any desired triggering arrangement may be employed.

Figure 2:
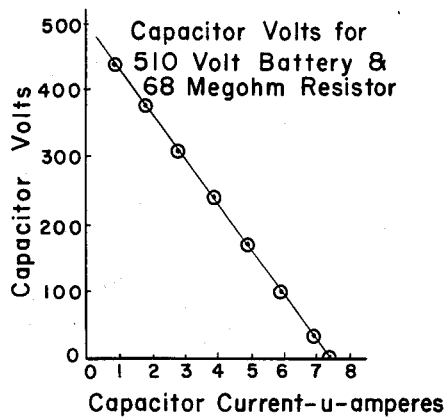
Figure 2 is a graph illustrating the condenser volts for a 510 volt battery and a 69 megohm resistor.

Figure 2 graph is quite self-explanatory. It illustrates the approximate voltage which will appear across the capacitor from a 510 volt battery and a 68 megohm resistor based on leakage currents in the range of those which will be found in commercial 500 microfarad capacitors constructed of high purity foil. The leakage currents shown may not be reached immediately, but these represent leakage currents which will be found at the end of, for example, 30 minutes to 1 hour after the unit is turned off. Over a long period of time, for example one month, the leakage current will become lower and therefore the voltage appearing at the capacitor terminals will become higher. This leakage current also varies with other factors, in particular temperature, the leakage current rising with temperature and falling as the temperature drops. This matter is of no particular importance and has no specific effect on a unit constructed in accordance with my invention.

Figure 3:
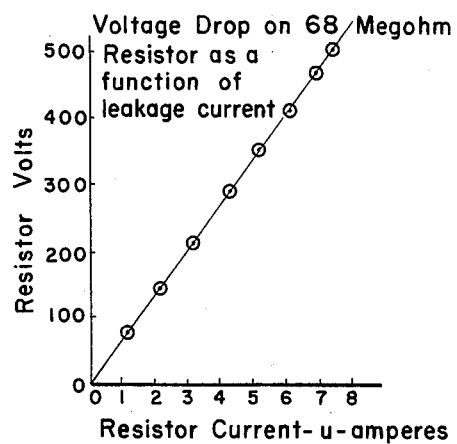
Figure 3 is a graph illustrating the drop through the resistor as a function of leakage current for a 68 megohm resistor, these values being the reciprocal of the values in Figure 2.

Figure 3 graph is the reciprocal of Figure 2 graph and illustrates the voltage drop which will occur across the series charging resistor for a resistor of 68 megohms.

Figure 4:
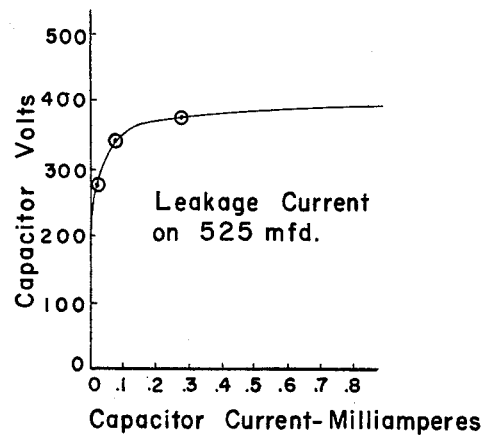
Figure 4 is a graph illustrating the approximate relationship between leakage current and applied voltage for a 500 microfarad 450 volt high purity foil electrolytic capacitor.

Figure 4 graph illustrates the approximate relationship between applied voltage and leakage current for a 500 microfarad high purity foil type capacitor, it being understood that these figures are subject to wide variation, possibly as much as 50 percent in commercial units, but where a sufficiently high resistor is used, as illustrated in the example above, the current will be held to a value which will not have any substantial effect on battery life. While no limits have been established on this by either the battery manufacturers or my own experiments, it has been shown by experiment and by calculation that a current on the order of 5 microamperes will not substantially shorten the life of a type U cell and a current of 10 microamperes will not substantially shorten the life of the NS type cell so that selection of the value of resistor 5 will depend upon the characteristics of the capacitor being charged and also the type of cell construction being used in battery 1. The values of leakage current in Figure 4 do not represent either initial values or final values, but represent the proper order of magnitude for currents after the capacitor has been fully and completely formed and then reduced to a voltage as indicated by the curve. At the end of a period of time, for example 30 minutes to 1 hour, the value of current will then be near the value indicated by the curve.

The advantages of my invention are that the capacitor is not allowed to deform and if deformation does occur, it is only partial and as a result thereof the battery is not required to furnish high forming currents to reform the capacitor after it has been out of service for a substantial period of time. As a result of this, the charging time for the capacitor, sometimes referred to as the recycling time, becomes very short. For a new battery this will be on the order of 1 second or less and for a battery near its useful end point it will be on the order of 5 seconds. For a similar unit operated without the features disclosed by my invention, these recycling times may well be on the order of 5 seconds for new batteries and several minutes for a battery near the end point. As a result of this novel feature disclosed by my invention, a battery of relatively small size will have a much longer life and produce a much greater number of flashes because it is not required to produce a high forming current each time the unit is turned on after a period of idleness. The total amount of energy consumed from the battery in keeping the capacitor formed is substantially less than that which may be required to form a completely deformed capacitor a single time, and it would be a reasonable assumption that the average photographer, in taking 500 flash pictures, would turn the unit off and on at least 50 times, and under these conditions the battery would be required to reform the capacitor each of those 50 separate times, where the amount of deformation that the battery was required to overcome would depend primarily upon the length of time that voltage was removed from the capacitor. This cannot occur with units constructed in accordance with the principles that I have disclosed.

In disclosing my invention I have shown a specific circuit and given to the resistors, capacitor and battery involved definite values, but I desire it to be understood that such has been done by way of example only. Therefore, being aware of modifications and changes, all without departing from the fundamental principles of my invention, it is not my intention to have the scope of the invention limited in any manner other than as called for by the terms and equivalents of the appended claims.

What is claimed is:

1. Apparatus for producing a flash of light for photographic purposes comprising a gas filled lamp having main electrodes and means for triggering the lamp to cause an abrupt discharge thereof between said electrodes, a dry cell battery, an electrical energy storage capacitor of the electrolytic type, means connecting said capacitor across said electrodes, a high value resistance, means continuously connecting said capacitor to said battery in series with said resistance, a switch for placing said apparatus in condition to be used, means connecting said switch across said high value resistance so that upon closure of said switch, said capacitor is connected to said battery independently of said resistance to be fully charged thereby so as to supply adequate energy for the firing of said lamp, and means for energizing said triggering means to cause discharge of the capacitor through said lamp, said high value resistance having such value in relation to the voltage of the battery and the leakage characteristics of the capacitor that upon opening of said switch a voltage will be maintained on the capacitor sufficient to prevent deforming thereof but the current continuing to flow through said resistance will be so minute that said battery will remain effective over many months despite said continual flow of current.

2. Apparatus for producing a flash of light for photographic purposes comprising a gas filled lamp having main electrodes and means for triggering the lamp to cause an abrupt discharge thereof between said electrodes, a primary source of unidirectional power, an electrical energy storage capacitor of the electrolytic type, means connecting said capacitor across said electrodes, a high value resistance, means continuously connecting said capacitor to said source of unidirectional power in series with said resistance, a switch for placing said apparatus in condition to be used, means connecting said switch across said high value resistance so that upon closure of said switch, said capacitor is connected to said source of power independently of said resistance to be fully charged thereby so as to supply adequate energy for the firing of said lamp, and means for energizing said triggering means to cause discharge of the capacitor through said lamp, said high value resistance having such value in relation to the voltage of the source of power and the leakage characteristics of the capacitor that upon opening of said switch a voltage will be maintained on the capacitor sufficient to prevent deforming thereof but the current continuing to flow through said resistance will not substantially exceed ten microamperes.

3. The apparatus of claim 2 in which the primary source of unidirectional power is a dry cell battery of the range of 450 to 550 volts and the high value resistance has a value in excess of 10 megohms.

4. Apparatus for producing a flash of light for photographic purposes comprising a gas filled lamp having main electrodes and means for triggering the lamp to cause an abrupt discharge thereof between said electrodes, a dry cell battery having a voltage of between 450 and 550 volts, an electrical energy storage capacitor of the electrolytic type, means connecting said capacitor across said electrodes, a high value resistance having a value in excess of 10 megohms, a low value resistance having a value not substantially exceeding 1000 ohms, means continuously connecting said capacitor to said battery in series with said high value and said low value resistances, a switch for placing said apparatus in condition to be used, means connecting said switch across said high value resistance so that upon closure of said switch, said capacitor is connected to said battery through said low value resistance but independently of said high value resistance to be fully charged thereby so as to supply adequate energy for the firing of said lamp, and means for energizing said triggering means to cause discharge of the capacitor through said lamp, said high value resistance having such value in relation to the voltage of the battery and the leakage characteristics of the capacitor that upon opening of said switch a voltage will be maintained on the capacitor sufficient to prevent deforming thereof but the current continuing to flow through said resistance will not substantially exceed ten microamperes.

5. The apparatus of claim 4 in which said battery has an intermediate tap which is connected to said means for energizing said triggering means.

References Cited in the file of this patent

UNITED STATES PATENTS

| 2,201,166 | Germeshausen | May 21, 1940 |
| 2,399,222 | Germeshausen | Apr. 30, 1946 |
| 2,492,247 | Weaving | Dec. 27, 1949 |